US006208911B1

(12) United States Patent
Yamaoka et al.

(10) Patent No.: US 6,208,911 B1
(45) Date of Patent: *Mar. 27, 2001

(54) SOLID DRUG FILLING APPARATUS

(75) Inventors: Kazushi Yamaoka; Ryuzo Tobe; Hideyuki Takahashi; Manabu Haraguchi, all of Gunma-ken (JP)

(73) Assignee: Sanyo Electric Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,595

(22) Filed: Dec. 23, 1997

(30) Foreign Application Priority Data

Dec. 27, 1996 (JP) .................................................. 8-358473

(51) Int. Cl.[7] ..................................................... G06F 17/00

(52) U.S. Cl. .......................... 700/242; 700/236; 700/240; 700/216; 700/244; 221/2; 221/7

(58) Field of Search ............................... 221/7, 121, 122, 221/132, 2, 200, 297, 298, 299; 141/104; 453/13, 20; 700/236, 240, 242, 216, 244

(56) References Cited

U.S. PATENT DOCUMENTS

| | | | | |
|---|---|---|---|---|
| 2,831,603 | * | 4/1958 | Roots | 221/122 |
| 3,368,713 | * | 2/1968 | Hurst et al. | 221/7 |
| 3,837,139 | * | 9/1974 | Roseberg | 221/7 |
| 4,809,877 | * | 3/1989 | Albright | 221/121 |
| 4,811,764 | * | 3/1989 | McLaughlin | 141/104 |
| 4,846,364 | * | 7/1989 | Guigan et al. | 221/121 |
| 5,000,343 | * | 3/1991 | Allen | 221/121 |
| 5,014,875 | * | 5/1991 | McLaughlin et al. | 221/2 |
| 5,323,929 | * | 6/1994 | Marlar | 221/121 |
| 5,348,061 | * | 9/1994 | Riley et al. | 141/104 |
| 5,472,113 | * | 12/1995 | Shaw | 221/7 |
| 5,481,855 | | 1/1996 | Yuyama | 53/493 |
| 5,667,096 | * | 9/1997 | Wu | 221/132 |
| 5,752,368 | * | 5/1998 | Tobe et al. | 53/501 |
| 5,765,606 | * | 6/1998 | Takemasa et al. | 141/104 |
| 5,812,410 | * | 9/1998 | Lion et al. | 364/479.01 |
| 5,852,911 | * | 12/1998 | Yuyama et al. | 53/165 |
| 5,865,342 | * | 2/1999 | Ito et al. | 221/265 |
| 5,884,806 | * | 3/1999 | Boyer et al. | 221/75 |

FOREIGN PATENT DOCUMENTS

| | | | | |
|---|---|---|---|---|
| 0 719 537 A2 | | 7/1996 | (EP) | A61J/7/00 |
| 0118199 | * | 10/1978 | (JP) | 453/13 |

* cited by examiner

*Primary Examiner*—Christopher P. Ellis
*Assistant Examiner*—Michael E. Butler
(74) *Attorney, Agent, or Firm*—Darby & Darby

(57) ABSTRACT

Apparatus for filling a solid drug, such as tablets, into a predetermined vial includes a rotary plate with a plurality of receiving sections formed on the upper surface of this rotary plate. The receiving sections are disposed under a plurality of tablet cases for receiving the solid drugs discharged from the tablet cases. Discharge orifices are formed through the bottom portions of the respective receiving sections and a chute guides the solid drugs from an orifice to a predetermined vial. A shutter opens or closes this orifice or the chute. When the solid drug is discharged from the tablet case, the rotary plate is rotated by a control device to adjust the position of the receiving section as the solid drug falling from the tablet case is dropped in the predetermined receiving section. When filing the solid drug into the vial, the rotary plate is rotated by the control device so that the discharge orifice of the receiving section coincides with the chute, and the shutter is then opened to discharge the drug through the chute into the vial.

12 Claims, 13 Drawing Sheets

SOLID DRUG FILLING APPARATUS

BACKGROUND OF THE INVENTION

The present invention relates to a solid drug filling apparatus for filling a solid drug (all of solidified drugs such as tablets, capsules, pills, and troches will be referred to as solid drugs, hereinbelow) designated by a prescription into a vessel in a hospital or the like.

Hitherto, in the hospital or the like, by using a tablet packing machine as disclosed in, for example, Japanese Patent Application Publication Laid-Open No. 3-59 (1991) (A61J3/00), a plurality of kinds of tablets prescribed by a doctor are divided and packed every dose and are then presented to a client. According to the dividing and packing method, however, since tablets as much as dose are discharged, collected, and packed by a hopper, a conveyor, or the like, when a waiting time for collecting tablets is included, a long time is required until the packing is completed. Since the collecting operation of tablets entirely depends on a gravity by the hopper or conveyor, a size of the apparatus is large as a whole.

On the other hand, there is also a tablet filling apparatus for filling prescribed tablets into a vessel such as a phial (or a bag) every kind, thereby presenting to a client. In case of the tablet filling apparatus, the conventional apparatus is constructed in such a manner that a plurality of tablet cases each receiving tablets every kind are arranged so as to be inclined forwardly and lowly in a locker arrangement manner, a discharging mechanism for discharging a tablet in the tablet case is provided for each tablet case, and designated tablets in the tablet cases are discharged from the discharging mechanisms on the basis of a prescription, respectively.

In the tablet filling apparatus, since tablets are not divided and packed every dose, the filling operation of tablets can be performed for a short time as compared with the foregoing tablet packing machine. However, an operation such that an operator carries a vessel to the tablet cases and fills tablets from the discharging mechanisms into the vessel is necessary. Particularly, in case of many kinds of tablets, the operation to fill each kind of tablets into the vessel is very complicated, so that a long time is required.

Since the apparatus is constructed in such a manner that a plurality of tablet cases are arranged in a locker arrangement manner at a surface of a wall, a reduction in size of the whole apparatus which has been desired in the conventional tablet packing machine cannot be accomplished.

The applicant has developed a structure such that a turntable is provided under the plurality of arranged tablet cases, a holder device is further provided under the turntable, tablets discharged from the tablet cases are collected to a guide on the outer rim while being received on the turntable, the tablets are discharged from a discharge orifice formed through the guide into a holder of the holder device and is held.

According to the construction, the operation to fill tablets can be executed at one portion and a size of the whole apparatus in the vertical direction can be decreased as compared with the conventional apparatus of a conveyor type or a locker arrangement type. However, there is a limitation in decrease of size due to the relation that the rotating turntable and holder device have to be arranged in the vertical direction.

On the other hand, a further compaction of the apparatus has been desired and a development of a construction which can satisfy such a desire has been required. In the conventional structure, since motors are necessary to rotate the turntable and holder device, an electric power consumption increases and the structure is complicated.

SUMMARY OF THE INVENTION

The present invention is made in order to solve the conventional technical problems and intends that a structure of a solid drug filling apparatus for filling solid drugs such as tablets into a predetermined vessel is simplified and a size of the solid drug filling apparatus is remarkably decreased.

A solid drug filling apparatus of the present invention comprises a plurality of tablet cases for receiving solid drugs every kind, a rotary plate which is rotatably disposed under these tablet cases and which captures the solid drugs discharged from these tablet cases, a plurality of receiving sections formed on the upper surface of this rotary plate, discharge orifices formed through bottom portions of the respective receiving sections, a guide portion for guiding the solid drugs to a predetermined vessel, a shutter for opening or closing this guide portion or the discharge orifice, and a control device for discharging the solid drugs from the tablet cases receiving the predetermined kinds of solid drugs on the basis of predetermined prescription data, when the solid drug is discharged from the tablet case, the rotary plate being rotated by this control device to adjust the position of the receiving section, whereby the solid drug falling from the tablet case is dropped in the predetermined receiving section, in filling the solid drug into the vessel, the rotary plate being rotated by the control device so that the discharge orifice of the receiving section may coincide with the guide portion, the shutter being then opened.

According to the invention, solid drugs are discharged from the tablet cases for receiving solid drugs every kind by the control device. The solid drugs discharged from the tablet case are dropped in the predetermined receiving section whose position is adjusted by the rotation of the rotary plate and are temporarily received. The discharge orifice of the receiving section is made coincide with the guide portion by the rotation of the rotary plate and the shutter is then opened, so that the solid drugs in the receiving section are supplied to the guide portion from the discharge orifice and are guided into a vessel, and the vessel is filled.

Therefore, solid drugs designated among a plurality of kinds can be filled into a vessel at one guide portion, respectively, so that an operation efficiency is remarkably improved. In particular, since the operation such that the solid drug is dropped in the predetermined receiving section by only the rotation of the rotary plate and the discharge orifice of the receiving section may coincide with the guide portion is realized, a time required to fill can be remarkably reduced, so that a waiting time until drugs are presented to a client is further shortened and services can be improved.

For example, in case of successively filling a plurality of kinds of solid drugs, or the like, the solid drugs can be received and held in a plurality of receiving sections, respectively. Consequently, the processes can be smoothly executed in parallel. The number of machine parts is also reduced as compared with that of the conventional apparatus, so that the structure can be simplified and a further compaction of the apparatus can be realized. Accordingly, it is possible to further contribute to the effective use of spaces in facilities such as hospitals or pharmacies.

In the above-mentioned apparatus, the receiving sections are defined among a plurality of partitions formed on the upper surface of the rotary plate and the partitions are disposed so as to radially extend from the rotational center of the rotary plate.

According to the above construction, in addition to the foregoing, the receiving sections are constructed among a plurality of partitions formed on the upper surface of the rotary plate and the partitions are provided so as to radially extend from the rotational center of the rotary plate, so that a position adjusting control of the receiving section by a rotation angle of the rotary plate can be easily executed, an accurate and rapid operation is realized, and a reduction in costs for development of a control program or the like can be also realized.

Further, in the above respective inventions, the shutter opens or closes an inlet of the guide portion.

In addition to the above respective inventions, since the apparatus has a structure such that the inlet of the guide portion is opened or closed by the shutter, it is unnecessary to provide opening/closing means such as a shutter for the discharge orifice of each receiving section, so that the structure can be further simplified.

Further, in the above respective inventions, an openable lid is disposed at an outlet of the guide portion.

According to the above, in addition to the respective inventions, since the openable lid is provided at the outlet of the guide portion, the shutter is opened, solid drugs are discharged from the receiving section into the guide portion, and after that, the solid drugs can be held in the guide portion until the operator opens the lid. Therefore, the filling operation into a vessel can be certainly and easily executed.

DETAILED DESCRIPTION OF THE PREFERRED EMBODIMENT

Figure 1:
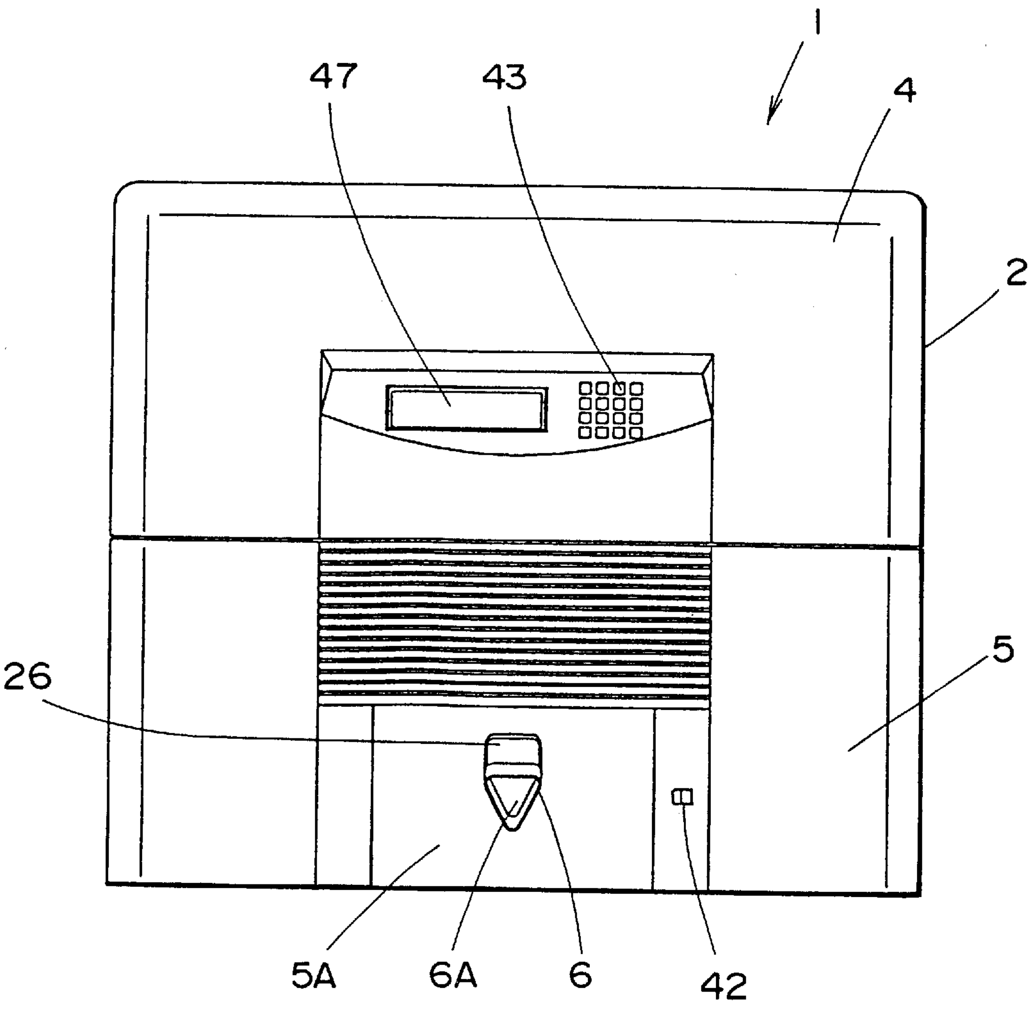
FIG. 1 is a front view of a solid drug filling apparatus of the present invention.
Figure 2:
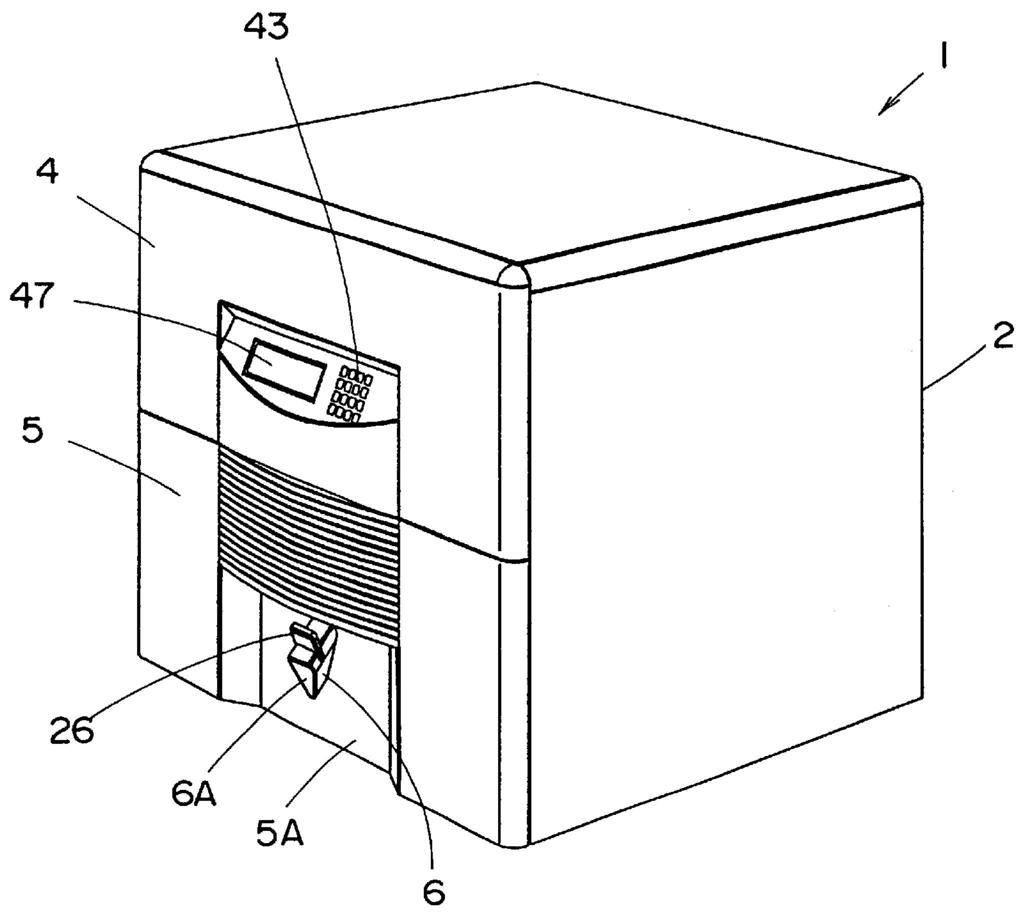
FIG. 2 is a perspective view of the solid drug filling apparatus of the invention.

An embodiment of the present invention will now be described in detail hereinbelow on the basis of the drawings.

A solid drug filling apparatus 1 of the present invention is set in a hospital, a pharmacy, or the like and comprises a solid drug enclosing unit 3 formed in a rectangular main body 2, a solid drug filling mechanism 10 provided under the unit 3, and the like. The solid drug enclosing unit 3 is constructed on an upper portion in the main body 2. A front surface of the solid drug enclosing unit 3 is blocked so as to be openable by an upper door 4 which is forwardly downwardly movable. A front surface of the solid drug filling mechanism 10 is blocked so as to be openable by a lower door 5 of a drawer type. The solid drug filling mechanism 10 can be drawn together with the lower door 5 from the main body 2.

A filling portion 5A is constructed so as to be slightly retracted in the inside at a center portion of the front surface of the lower door 5. An outlet 6A of a shoot 6 as a guide portion which will be described hereinlater, is opened in the filling portion SA. A bar code reader 42 is disposed so as to be located near the outlet 6A in the filling portion 5A. Further, a key switch 43 consisting of a numeral-key and a display device 47 for displaying a compounding situation such as contents of prescription data or alarm are arranged on a front surface of the upper door 4 corresponding to the upper portion of the filling portion 5A.

Figure 10:
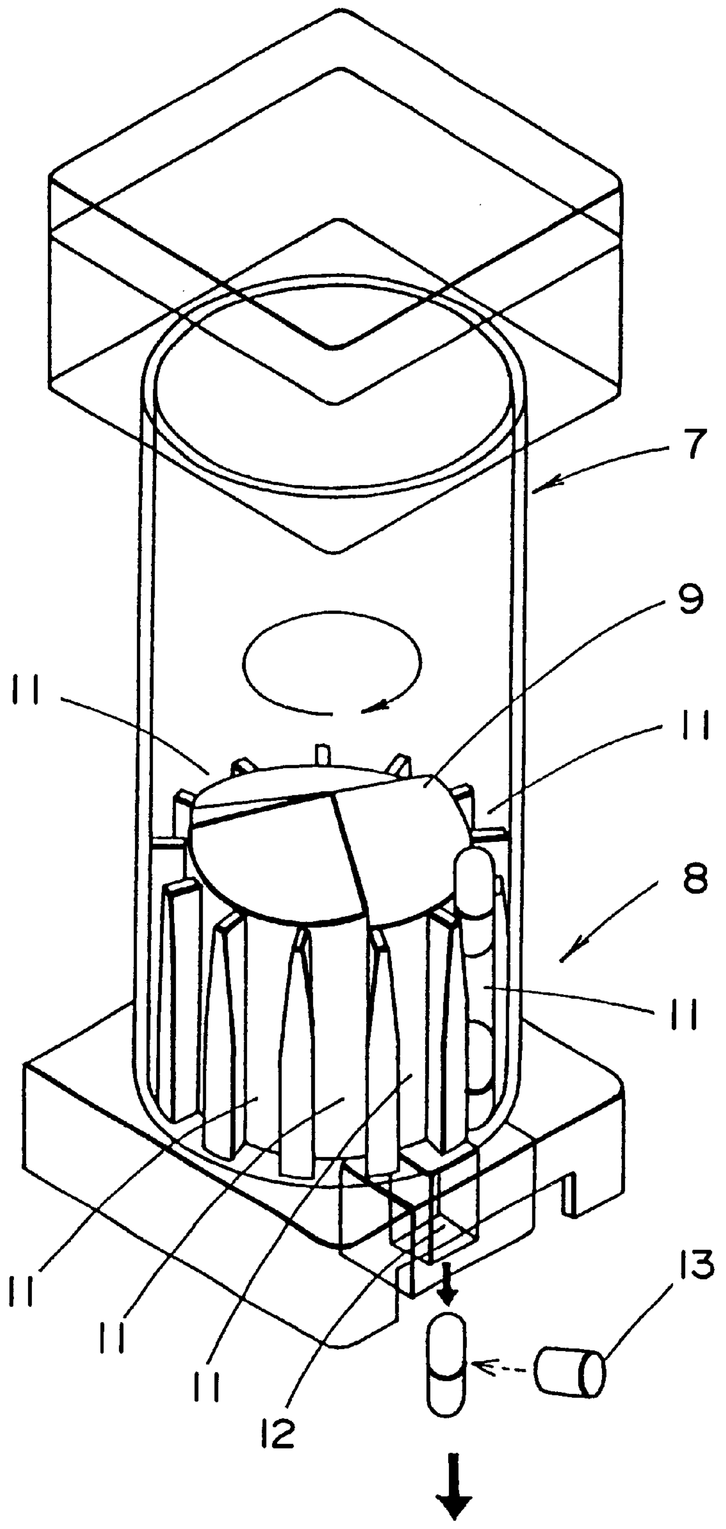
FIG. 10 is a transparent perspective view of a tablet case and a discharge counting device of the solid drug filling apparatus of the invention.

On the other hand, in the solid drug enclosing unit 3, a plurality of tablet cases 7 are enclosed. Solid drugs are received in the tablet cases every kind by a predetermined amount. A discharge counting device 8 is disposed under each tablet case 7 as shown in FIG. 10.

The discharge counting device 8 is connected to the tablet case 7 on the upper side, respectively. A discharge drum 9 of a motor driving system is built in the discharge counting device 8. A plurality of grooves 11 are formed in the vertical direction on the side surface of the discharge drum 9. Solid drugs serving as solidified drugs such as tablets, capsules, pills, and troches (two drugs in the embodiment) are supplied into the groove 11 in line in the vertical direction. The solid drugs in the groove 11 are dropped one by one from an outlet 12 in association with the rotation of the discharge drum 9 (as shown by a black arrow in FIG. 10). A photosensor 13 to detect the solid drug falling from the outlet 12 is further attached to the discharge counting device 8.

Figure 3:
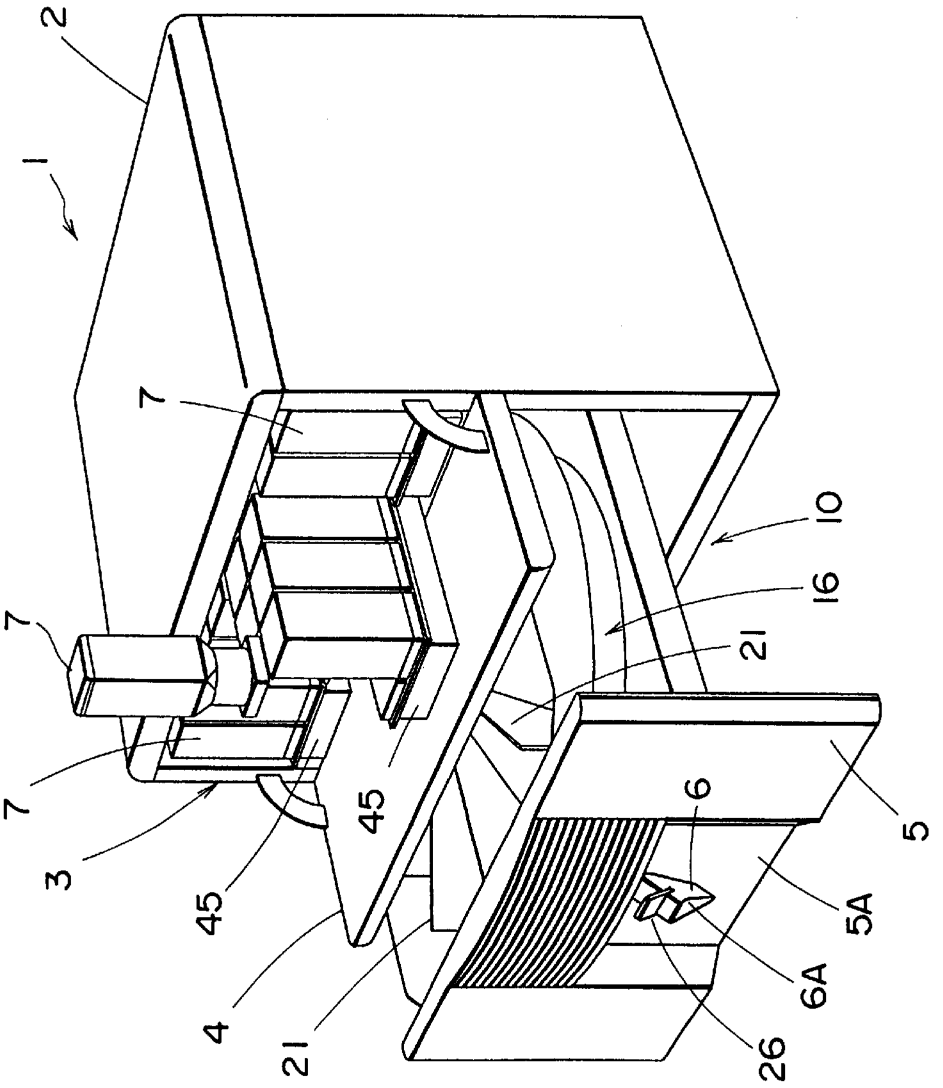
FIG. 3 is a perspective view showing a state in which upper and lower doors of the solid drug filling apparatus are opened.
Figure 4:
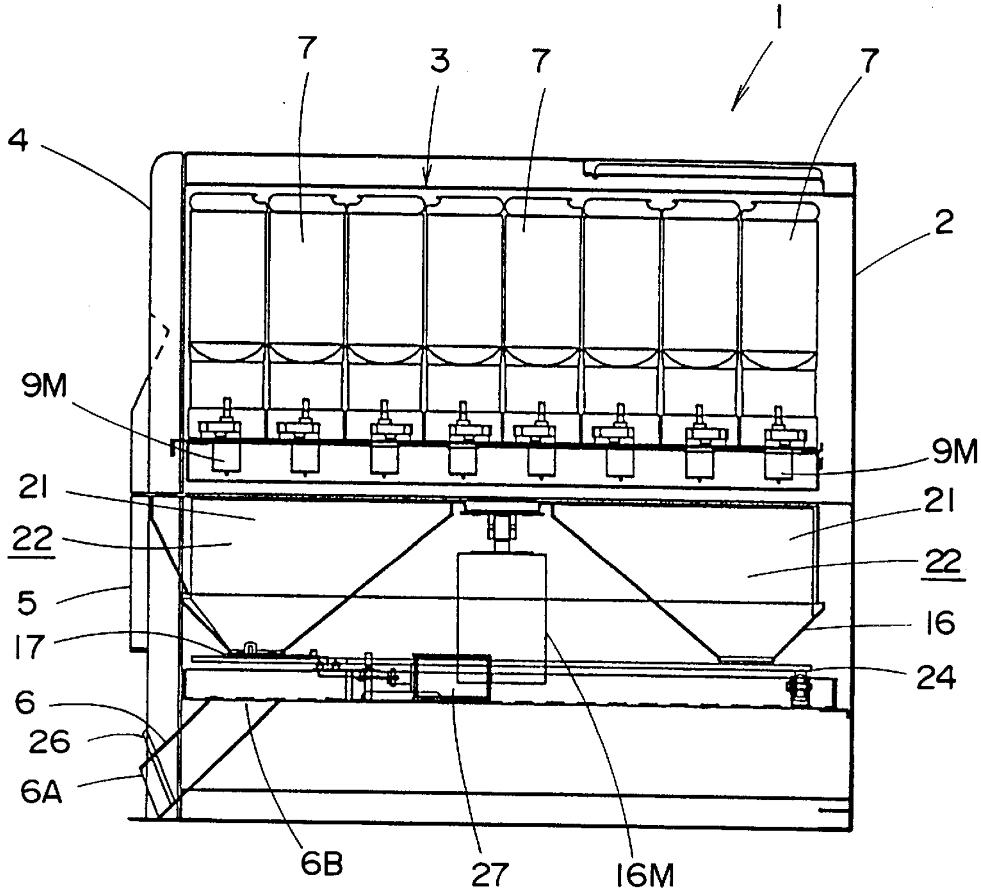
FIG. 4 is a longitudinal side elevational view of the solid drug filling apparatus of the invention.

The predetermined number of tablet cases 7 as mentioned above are set on a rectangular receiving member 45. A plurality of receiving members 45 are arranged in parallel. Each of the receiving members 45 is held so as to be drawable backwardly and forwardly by a rail (not shown) (refer to FIG. 3).

In case of supplementing solid drugs to the tablet case 7, or the like, the upper door 4 is opened, the receiving member 45 is drawn, and the tablet case 7 is moved onto the upper door 4. After completion of the supplement of solid drugs to the tablet cases 7, the receiving member 45 is pushed, thereby being returned into the solid drug enclosing unit 3.

Since the tablet cases 7 are drawn backwardly and forwardly as mentioned above, even when no space is maintained over the solid drug filling apparatus 1, the supplement of solid drugs into the tablet cases 7 or a replacement of the tablet case 7 itself can be executed, so that the saving of spaces can be realized.

Figure 5:
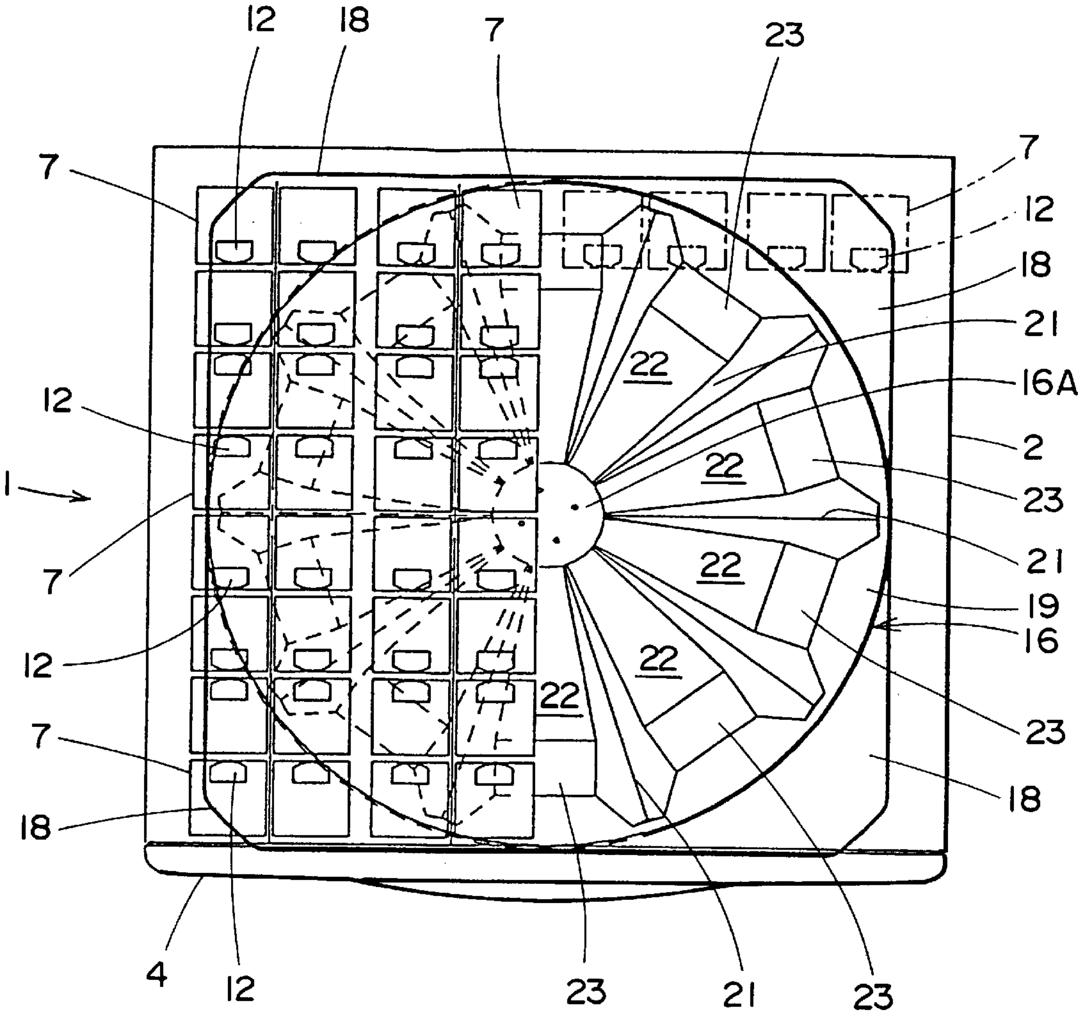
FIG. 5 is a plan sectional view of the solid drug filling apparatus of the invention.
Figure 6:
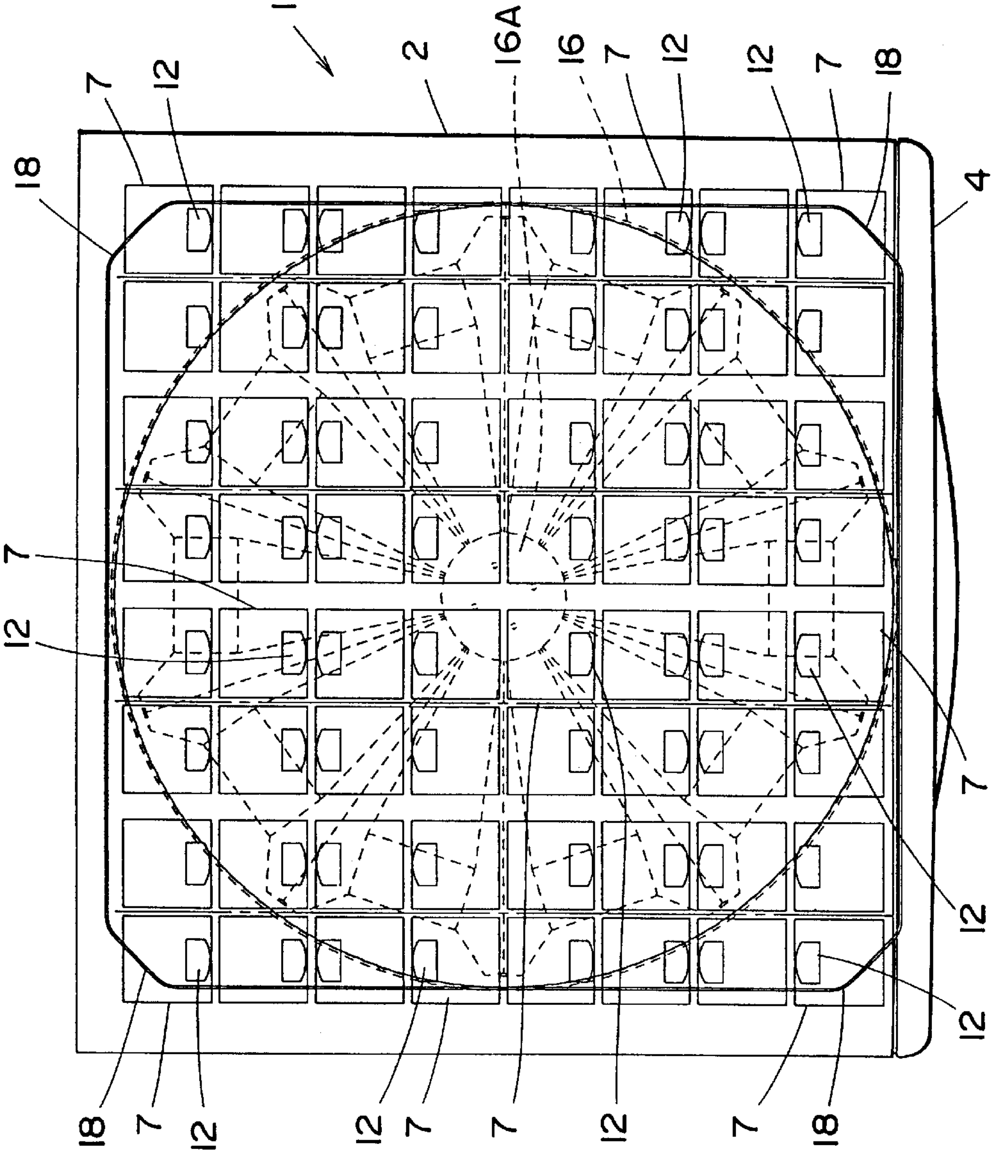
FIG. 6 is a plan view showing an internal construction of the solid drug filling apparatus of the invention.
Figure 7:
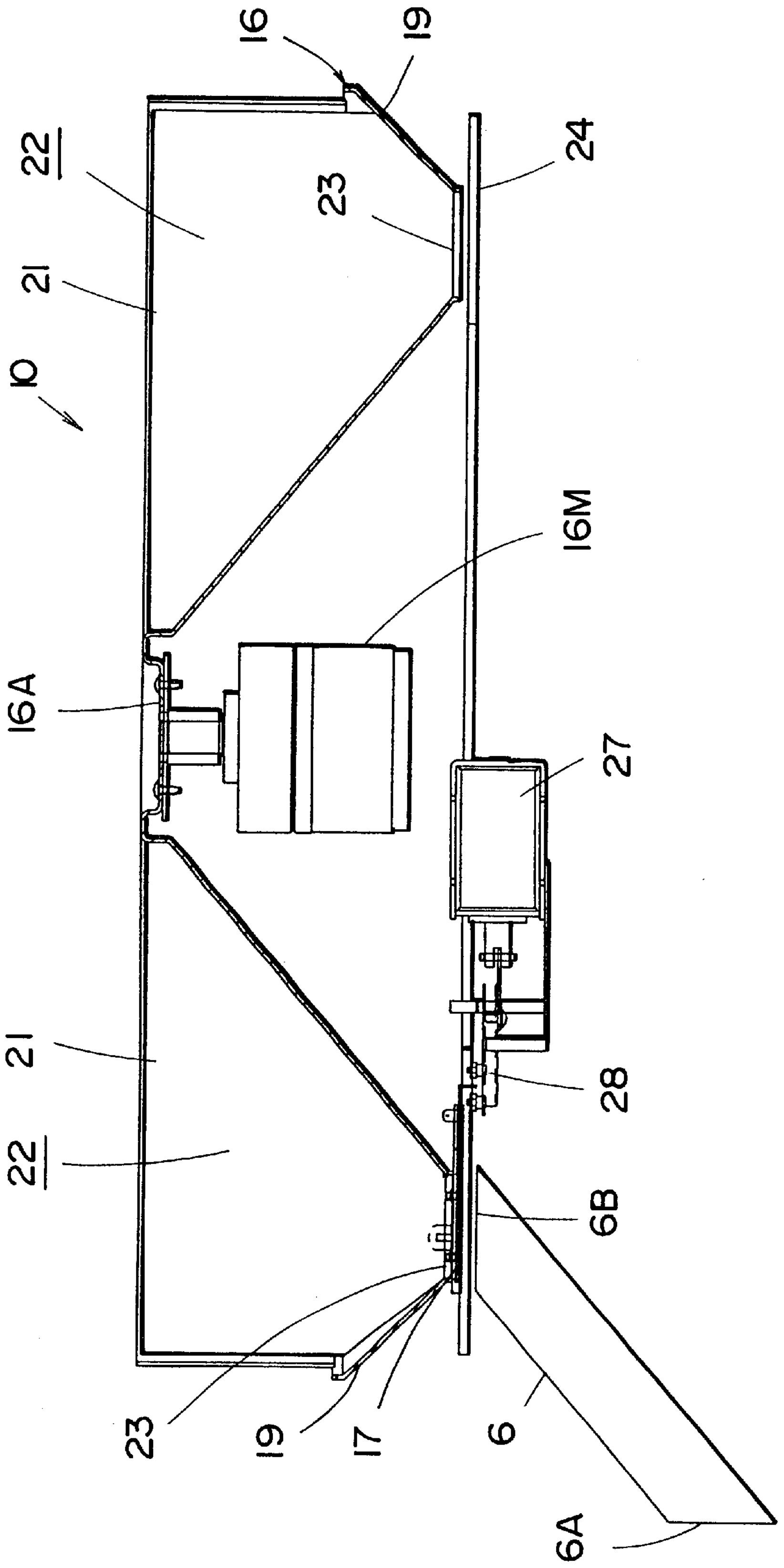
FIG. 7 is a longitudinal side elevational view of a solid drug filling mechanism of the solid drug filling apparatus of the invention.

The solid drug filling mechanism 10 comprises: a disk-shaped rotary plate 16; a shutter 17; the foregoing shoot 6; and the like. The rotary plate 16 is disposed so as to be rotatable under the tablet cases 7. As shown in FIG. 5 or 6, the tablet cases 7 are arranged in the form of almost square in a plan. A rotational center 16A of the rotary plate 16 corresponds to a center of the square.

Auxiliary plates 18 which are inclined lowly in the direction to the rotary plate 16 are attached to four corners on the outside of the rotary plate 16. Lower parts of the outlets 12 of all of the tablet cases 7 are covered by the rotary plate 16 and the auxiliary plates 18. The tablet cases 7 located on the center portion are disposed so that the outlets 12 thereof avoid the rotational center 16A of the rotary plate 16 (FIG. 6).

Figure 8:
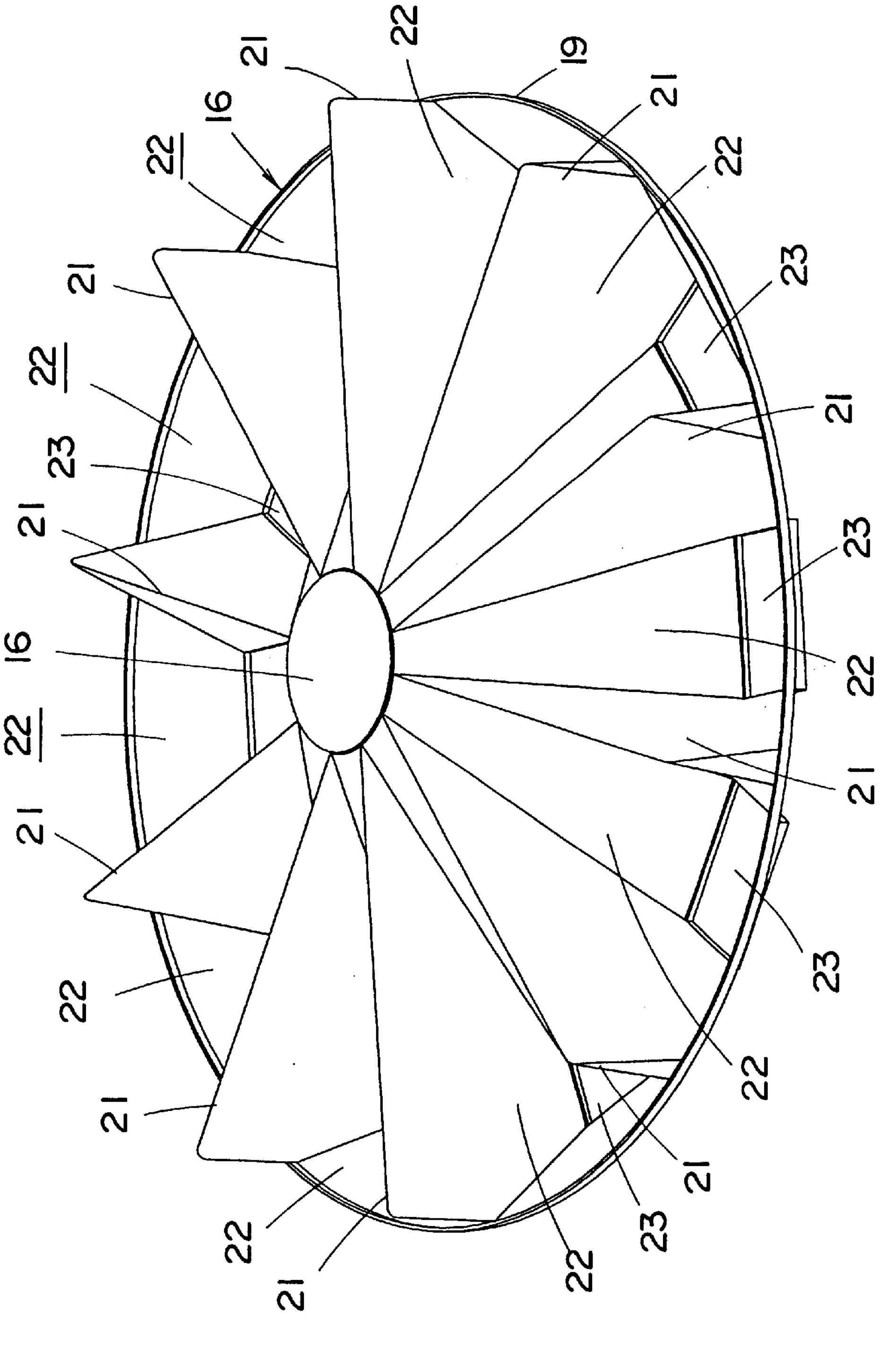
FIG. 8 is a perspective view of a rotary plate of the solid drug filling apparatus of the invention.
Figure 9:
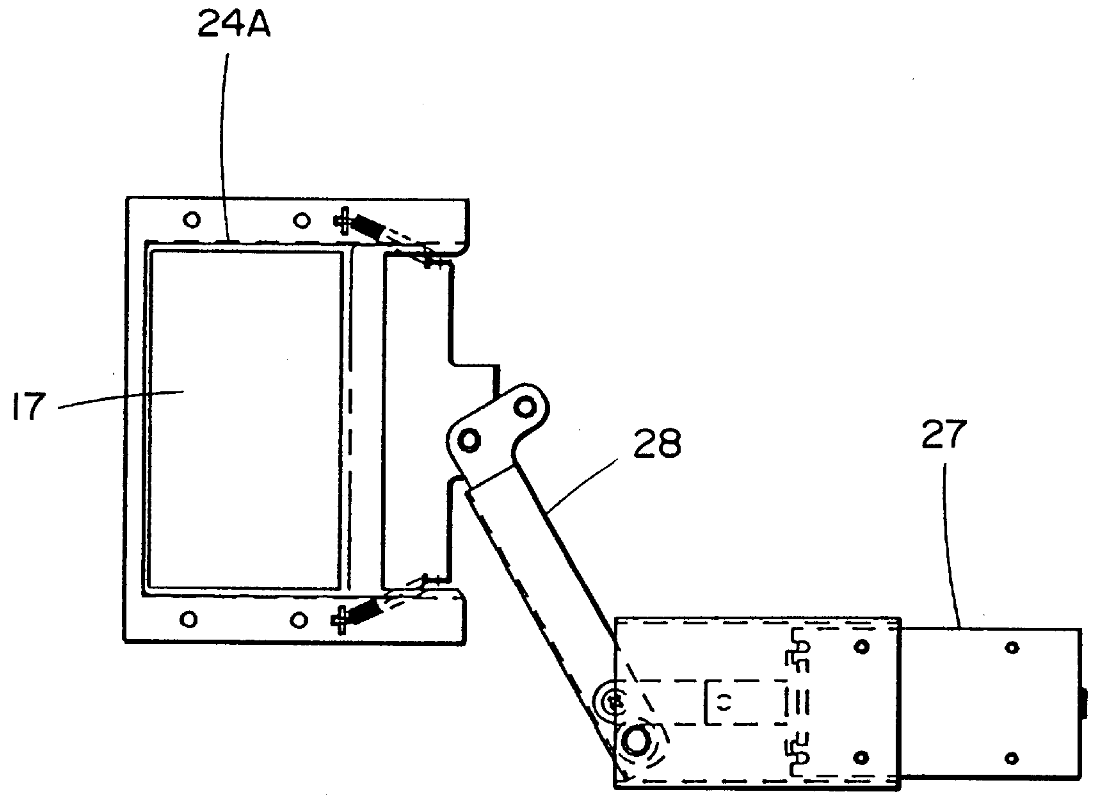
FIG. 9 is a plan view of a shutter of the solid drug filling apparatus of the invention.

As shown in FIG. 8, an upper surface of the rotary plate 16 is inclined outwardly and lowly from an outer rim side of the plane circular rotational center 16A of the center. An outer rim portion thereof stands up obliquely and outwardly, thereby serving as a flange 19. A plurality of (in the embodiment, ten) partitions 21 which radially extend from the rotational center 16A are provided on the upper surface of the rotary plate 16. A plurality of (in the embodiment, ten) receiving sections 22 are defined between these partitions 21 on the upper surface of the rotary plate 16.

An upper end of each partition 21 extends up to a height that is almost the same as that of the rotary center 16A. The partition is formed so as to be sharp at the upper edge and be gradually wider toward downside. A rectangular dischare orifice 23 is formed on the bottom portion in each of the receiving sections 22, namely, on a base of the flange 19 located on the outer rim of the rotary plate 16, respectively.

A rotary plate motor 16M comprising a step motor and the like is disposed under the rotational center 16A of the rotary plate 16. A rotational axis of the rotary plate motor 16M is fixed to a rear surface of the rotational center 16A. The rotary plate 16 is rotated by the rotary plate motor 16M.

A base plate 24 is provided under the rotary plate 16. A rectangular through-hose 24A is disposed by cutting a center of a front portion of the base plate 24. The rotary plate 16 is rotated on the base plate 24. One of the discharge orifices 23 of the rotary plate 16 alternatively coincides with the through-hole 24A due to the rotation and the other discharge orifices 23 are closed by the base plate 24.

The shoot 6 has a cylindrical shape and an upper end inlet 6B thereof is opened under the through-hole 24A of the base plate 24. The shoot 6 extends obliquely forward and downward and faces on the filling portion 5A on the front surface of the lower door 5 as mentioned above. The lower end outlet 6A of the shoot 6 is opened in the filling portion 5A. A detachable lid 26 is attached on this side of the outlet 6A of the shoot 6. The outlet 6A is set to be openable by the lid 26.

The shutter 17 is provided so as to be movable in the horizontal direction for the through-hole 24A of the base plate 24. The shutter 17 is moved backward and forward by a shutter opening/closing solenoid 27 and a linkage 28 similarly attached to the base plate 24, thereby opening or closing the inlet 6B of the shoot 6 located under the shutter 17.

Figure 11:
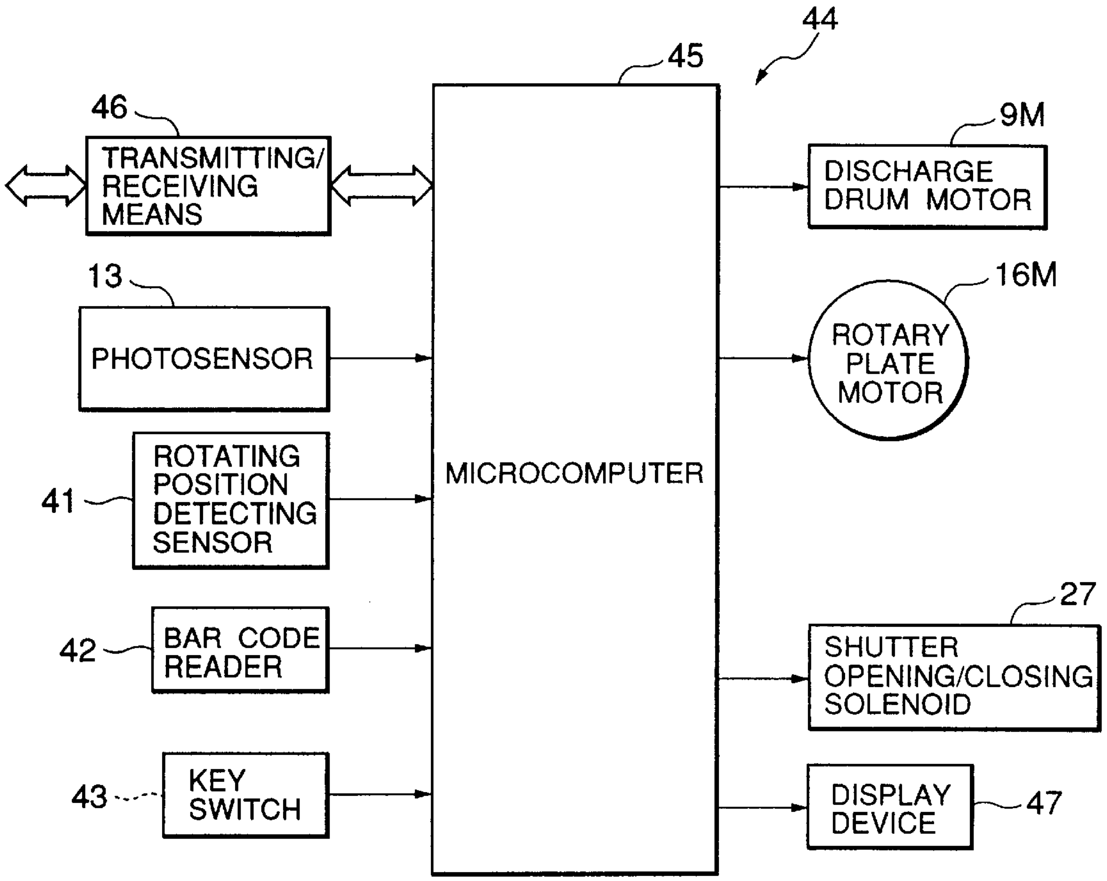
FIG. 11 is a block diagram of a control device of the solid drug filling apparatus of the invention.

FIG. 11 shows a block diagram of a control device 44 of the solid drug filling apparatus 1 of the present invention. The control device 44 is constructed by a general microcomputer 45. A transmitting/receiving means 46 for transmitting or receiving data to/from an external personal computer or the like (not shown) is connected to the microcomputer 45. The photosensor 13 of the discharge counting device 8, a rotating position detecting sensor 41 for detecting a rotating position of the rotary plate 16, a bar code reader 42, and the key switch 43 are also connected to input terminals of the microcomputer 45.

A discharge drum motor 9M for rotating the discharge drum 9 of the discharge counting device 8, the rotary plate motor 16M, shutter opening/closing solenoid 27, and display device 47 are connected to output terminals of the microcomputer 45.

Figure 12:
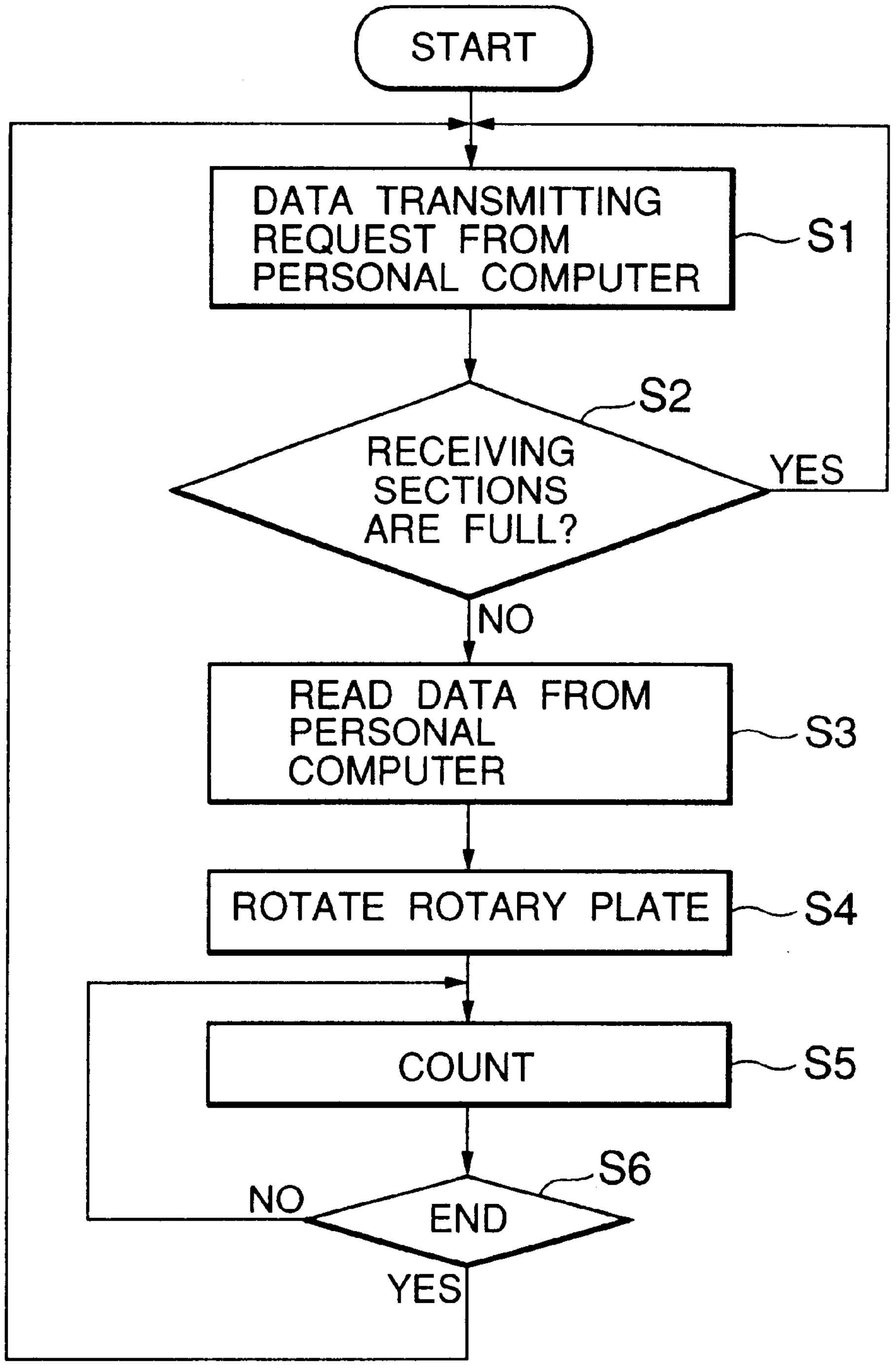
FIG. 12 is a flowchart showing a program of a microcomputer of the control device of the solid drug filling apparatus of the invention.
Figure 13:
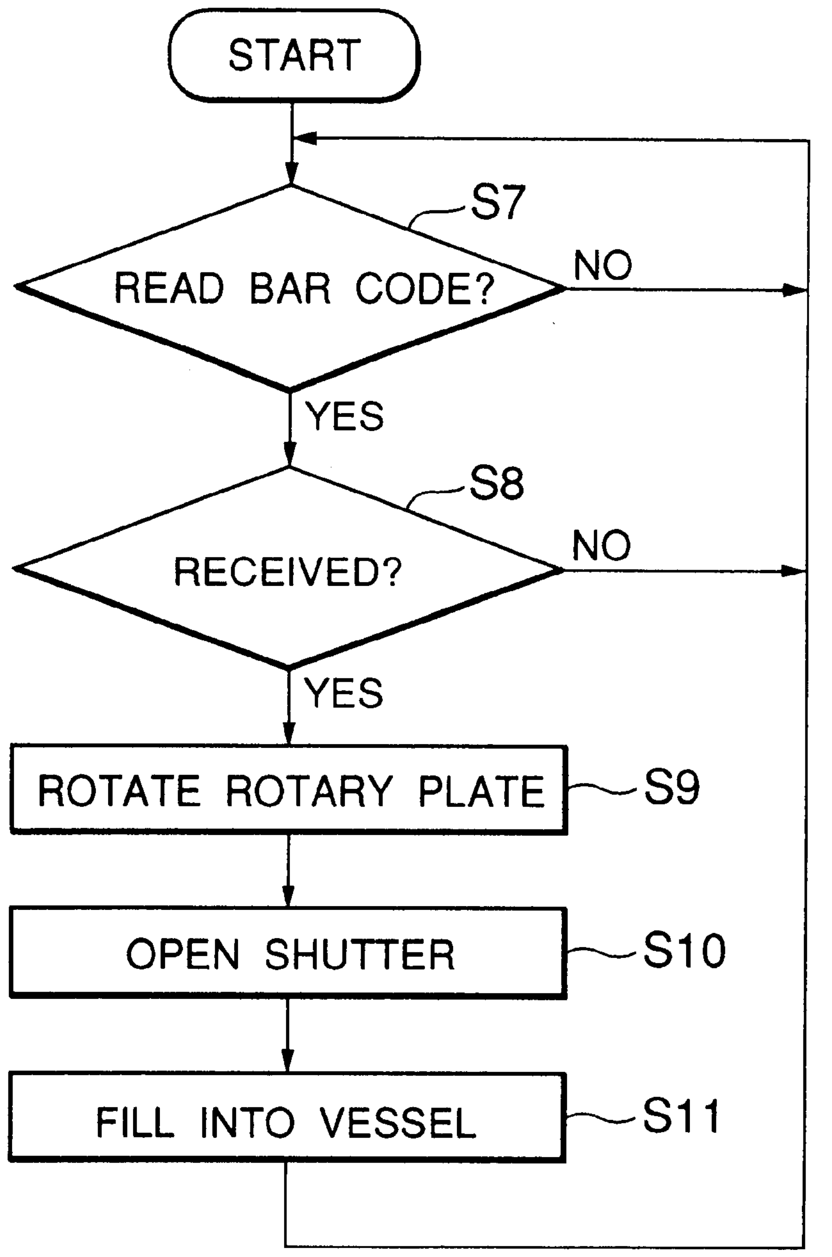
FIG. 13 is a flowchart similarly showing a program of the microcomputer.

With the above construction, the operation of the solid drug filling apparatus 1 of the present invention will now be described. FIG. 12 shows a flowchart of a program of the microcomputer 45 for the solid drug filling operation. FIG. 13 also shows a flowchart of the program of the microcomputer 45 for the solid drug filling operation.

In a state in which a power source is turned on, the through-hole 24A and the inlet 6B of the shoot 6 are closed by the shutter 17 and counting values and the like are reset. For example, the microcomputer 45 recognizes a predetermined receiving section 22 (for instance, this section is set to No. 1) on the basis of the rotating position detecting sensor 41 and a predetermined mark (not shown) provided on the rotary plate 16. The microcomputer 45 allows the rotary plate motor 16M to rotate the rotary plate 16 and initially sets so that the receiving section 22 of No. 1 is located to the position of the through-hole 24A (shutter 17) at the front center.

In this state, the microcomputer 45 recognizes positions of the other receiving sections 22 of No. 2 to No. 10 arranging together with the relevant receiving section 22 by using rotation angles in case of assuming that the position of the transparent window 24 (position of the receiving section 22 of No. 1) is set to 0 degree. Further, the microcomputer 45 has stored positions of the outlets 12 of the tablet cases 7 and calculates a rotation angle (including 0 degree) of the rotary plate 16 for moving the predetermined receiving section 22 to a position under the outlet 12 of the predetermined tablet case 7 on the basis of the information.

When the operator inputs prescription data into the foregoing personal computer on the basis of a prescription by a doctor, a data transmitting request is generated from the personal computer to the solid drug filling apparatus 1. When receiving the data transmitting request from the personal computer by the transmitting/receiving means 46 in step S1, the microcomputer 45 of the solid drug filling apparatus 1 discriminates whether solid drugs are held in all of the receiving sections 22 of the rotary plate 16 and the sections are full in step S2. If YES, the processing routine is returned to step S1 and the microcomputer 45 waits.

If the receiving sections 22 are not full in step S2, the microcomputer 45 responds a fact that the microcomputer 45 enters a data waiting state to the personal computer in step S3 and receives and reads prescription data transmitted from the personal computer in response to the reply. On the basis of the prescription data, the microcomputer 45 recognizes the position of the tablet case 7 for storing solid drugs of kinds designated by the prescription data.

Subsequently, the microcomputer 45 recognizes the receiving section 22 which is empty and the position thereof in step S4. For example, when the receiving section 22 of No. 1 is empty, the microcomputer 45 calculates the rotation angle as mentioned above, drives the rotary plate motor 16M, allows the rotary plate 16 to be rotated so that the receiving section 22 of No. 1 is moved under the outlet 12 of the recognized table case 7, adjusts the position of the receiving section 22, and stores the number of the receiving section.

As for the tablet cases 7 over the auxiliary plates 18, the position of the receiving section 22 is decided by previously estimating a path in which a drug is fallen via the auxiliary plate 18. When the empty receiving section 22 is accidentally located under the outlet 12 of the tablet case 7, the microcomputer 45 does not allow the rotary plate 16 to be rotated but stores the number of the receiving section 22.

Next, the microcomputer 45 rotates the discharge drum motor 9M of the discharge counting device 8 of the recognized tablet case 7 in step S5. Due to this operation, the discharge drum 9 is rotated and solid drugs are fallen one by one as mentioned above. The fallen solid dug is dropped in the receiving section 22 and is received.

The number of falling solid drugs is counted by the photosensor 13 by the microcomputer 45. A check is made to see in step S6 whether the counting operation is finished or not. If NO, the processing routine is returned to step S5 and the process is repeated. When the number of falling solid drugs detected by the photosensor 13 coincides with the number of solid drugs based on the prescription data, the microcomputer 45 discriminates that the counting operation is finished and stops the rotation of the discharge drum motor 9M. The processing routine is returned to step S1.

On the other hand, the solid drugs dropped in the receiving section 22 (for example, No. 1) are moved to the outside by an inclination of the upper surface of the rotary plate 16 and then reach the discharge orifice 23. In this state, since the discharge orifice 23 is closed by the base plate 24 or shutter 17, the solid drugs are temporarily held in the receiving section 22.

The microcomputer 45 repeats the operations from steps S4 to S6 with respect to solid drugs of all kinds designated by the prescription data, thereby receiving the solid drugs into the receiving sections 22 every kind, respectively.

On the other hand, the operator pastes up a bar code label on which a bar code indicative of one kind among the solid drugs designated by the prescription data has been printed onto a side surface of a predetermined vessel (for example, a phial). When the phial is inserted into the filling portion 5A of the solid drug filling apparatus 1, the bar code on the bar code label is read by the bar code reader 42.

The microcomputer 45 discriminates whether the bar code (the kind of solid drugs) read by the bar code reader 42 has been read or not in step 7 in FIG. 13. If YES, step S8 follows. A check is made to see whether the solid drugs of the relevant kind have been received in the receiving section 22 (the number of this receiving section 22 has been stored as mentioned above). If the section is not filled yet, the processing routine is returned to step S7 and the microcomputer 45 waits.

When the solid drugs of the relevant kind have been stored in the receiving section 22 in step S6, the processing routine advances from step S8 to step S9. The microcomputer 45 selects the receiving section 22 filled with the solid drugs by the number which has been stored, drives the rotary plate motor 16M to rotate the rotary plate 16, and positions the relevant receiving section 22 to the position of the through-hole 24A (shutter 17) on the basis of the rotating position detecting sensor 41.

In this state, the discharge orifice 23 of the relevant receiving section 22 coincides with the through-hole 24A and also coincides with the inlet 6B of the shoot 6 so as to sandwich the shutter 17. Subsequently, the microcomputer 45 supplies a current to the shutter opening/closing solenoid 27 in step S10, moves the shutter 17 via the linkage 28, and opens the through-hole 24A.

By opening the shutter 17, the solid drugs in the receiving section 22 are fallen from the discharge orifice 23 into the shoot 6. At this time, the outlet 6A of the shoot 6 is closed by the lid 26, so that the solid drugs are held in the shoot 6.

In this state, an opening of the phial is fit to a portion under the outlet 6A of the shoot 6, the lid 26 is opened, and then, the relevant kind of solid drugs are supplied from the shoot 6 into the phial (step S11).

As mentioned above, according to the invention, solid drugs are discharged from the tablet cases 7 for receiving solid drugs every kind by the microcomputer 45. The solid drugs discharged from the tablet cases 7 are fallen in the predetermined receiving section 22 whose position was adjusted by the rotation of the rotary plate 16. The fallen solid drugs are temporarily received. The discharge orifice 23 of the receiving section 2 is made coincide with the inlet 6B of the shoot 6 by the rotation of the rotary plate 16. By opening the shutter 17, the solid drugs in the relevant receiving section 22 enter from the discharge orifice 23 to the shoot 6 and are guided into the phial, thereby filling the phial.

Therefore, since solid drugs designated among a plurality of kinds can be supplied into the phial by the one shoot 6, respectively, the operating efficiency is remarkably improved. In particular, since the operation such that the solid drugs are fallen into the predetermined receiving section 22 by only the rotation of the rotary plate 16 and the discharge orifice 23 of the relevant receiving section 22 is made coincide with the inlet 6B of the shoot 6 is realized, a time required to fill can be remarkably reduced, so that a waiting time until drugs are presented to a client is more further shortened and services can be improved.

In case of successively filling a plurality of kinds of solid drugs, or the like, the solid drugs can be received and held in a plurality of receiving sections 22, respectively. Consequently, the processes can be smoothly executed in parallel. The number of machine parts is also reduced as compared with that of the conventional apparatus, so that the structure can be simplified and a further compaction of the apparatus can be realized. Accordingly, it is possible to further contribute to the effective use of spaces in facilities such as hospitals or pharmacies.

Further, the partitions 21 are disposed so as to radially extend from the rotational center 16A of the rotary plate 16, so that the position adjusting control of the receiving section 22 by a rotation angle of the rotary plate 16 can be easily executed, an accurate and rapid operation is realized, and a reduction in costs for development of a control program or the like can be also realized.

In this instance, the inlet 6B of the shoot 6 is opened or closed by the shutter 17 in the embodiment. It is also possible to provide an opening/closing means such as a shutter for each discharge orifice 23. In case of using the structure of the embodiment, it is unnecessary to provide an opening/closing means for each of the discharge orifices 23 of the receiving sections 22, so that the structure can be further simplified.

Since the openable lid 26 is provided at the outlet 6A of the shoot 6, the shutter 17 is opened, solid drugs are discharged from the receiving section 22 into the shoot 6, and after that, the solid drugs can be held in the shoot 6 until the operator opens the foregoing lid 26. Therefore, the filling operation into a phial can be certainly and easily executed.

Although the embodiment has been explained with respect to the construction such that the apparatus is operated by prescription data from a host computer, the present invention is not limited. Even in case of executing a using method of a stand-alone manner in which prescription data is inputted by the key switch 43, the present invention is effective. In the embodiment, the solid drugs are filled into the phial. The invention is not limited to the foregoing but it is also sufficient that a packing back made of resin, paper, or the like is used as a vessel and is filled with solid drugs.

As mentioned in detail, according to the invention, solid drugs are discharged from the tablet cases for receiving solid drugs every kind by the control device. The solid drugs discharged from the tablet case are dropped in the predetermined receiving section whose position is adjusted by the rotation of the rotary plate and are temporarily received. The discharge orifice of the receiving section is made coincide with the guide portion by the rotation of the rotary plate and the shutter is then opened, so that the solid drugs in the receiving section are supplied to the guide portion from the discharge orifice and are guided into a vessel, and the vessel is filled.

Therefore, solid drugs designated among a plurality of kinds can be filled into the vessel at one guide portion, respectively, so that the operation efficiency is remarkably improved. In particular, since the operation such that the solid drug is dropped in the predetermined receiving section by only the rotation of the rotary plate and the discharge orifice of the receiving section is made coincide with the guide portion is realized, a time required to fill can be remarkably reduced, so that a waiting time until drugs are presented to a client is further shortened and services can be improved.

For example, in case of successively filling a plurality of kinds of solid drugs or the like, the solid drugs can be received and held in a plurality of receiving sections, respectively. Consequently, the processes can be smoothly executed in parallel. The number of machine parts is also reduced as compared with that of the conventional apparatus, so that the structure can be simplified and a further compaction of the apparatus can be realized. Accordingly, it is possible to further contribute to the effective use of spaces in facilities such as hospitals or pharmacies.

Further, in the above-mentioned apparatus, the receiving sections are defined among a plurality of partitions formed on the upper surface of the rotary plate and the partitions are disposed so as to radially extend from the rotational center of the rotary plate, so that a position adjusting control of the receiving section by a rotation angle of the rotary plate can be easily executed, an accurate and rapid operation is realized, and a reduction in costs for development of a control program or the like can be also realized.

Further, in the above respective inventions, since the apparatus has a structure such that the inlet of the guide portion is opened or closed by the shutter, it is unnecessary to provide an opening/closing means such as a shutter for the discharge orifice of each receiving section, so that the structure can be further simplified.

In addition to the respective inventions, since the openable lid is provided at the outlet of the guide portion, the shutter is opened, solid drugs are discharged from the receiving section into the guide portion, and after that, the solid drugs can be held in the guide portion until the operator opens the lid. Therefore, the filling operation into a vessel can be certainly and easily executed.

What is claimed is:

1. A solid drug filling apparatus which comprises:

a plurality of tablet cases each for holding solid drugs, a plate rotatably disposed under said tablet cases to receive solid drugs falling out of said cases, said plate having a plurality of partition members spaced apart on its upper surface to form a plurality of receiving sections, each receiving section arranged to capture solid drugs falling from said tablet cases, and a discharge orifice through said plate for each of said sections, a guide portion having an inlet for receiving solid drugs passing through a receiving section discharge orifice and an outlet to dispense the solid drugs into a vial, a shutter for opening or closing one of said guide portion inlet and discharge orifice, and a control device, responsive to data concerning discharge of solid drugs from said tablet cases for controlling the rotation of said plate to adjust the position of said plate to receive the solid drugs falling from the tablet cases into a predetermined receiving section, position the discharge orifice of said predetermined receiving section discharge orifice to coincide with said guide portion, and controll the opening of said shutter to discharge the solid drug into said guide portion.

2. The solid drug filling apparatus according to claim 1 wherein said partitions are disposed extending radially from the rotational center of said rotary plate.

3. The solid drug filling apparatus according to claim 1 wherein said shutter opens or closes the inlet of said guide portion.

4. The solid drug filling apparatus according to claim 2 wherein said shutter opens or closes the inlet of said guide portion.

5. The solid drug filling apparatus according to claim 1 further comprising an openable lid disposed at the outlet of said guide portion.

6. The solid drug filling apparatus according to claim 2 further comprising an openable lid disposed at the outlet of said guide portion.

7. The solid drug filling apparatus according to claim 3 further comprising an openable lid disposed at the outlet of said guide portion.

8. The solid drug filling apparatus according to claim 4 further comprising an openable lid disposed at the outlet of said guide portion.

9. A solid drug filling apparatus as in claim 1 wherein said guide portion comprises a base plate under said rotary plate and said inlet of said guide portion is a hole in said base plate, said shutter being located to open and close said opening in said base plate.

10. A solid drug filling apparatus as in claim 1 further comprising an outlet chute having an inlet below said base plate opening to receive the solid drugs dispensed into said base plate opening when said shutter opens said base plate opening.

11. A solid drug filling apparatus which comprises:

a plurality of tablet cases each for holding solid drugs, a rotary plate rotatably disposed under said tablet cases, said plate having a plurality of partition members spaced apart on its upper surface to form a plurality of receiving sections, each receiving section arranged to capture solid drugs dispensed from said tablet cases, and a discharge orifice through said plate of reach of said sections, a guide portion having an inlet for receiving solid drugs passing through a receiving section discharge orifice and an outlet to dispense the solid drugs into a vial, a shutter for opening or closing one of said guide portion inlet and discharge orifice, and a control device, responsive to data concerning discharge of solid drugs from said tablet cases, for controlling the rotation of said plate to adjust the position of said plate to receive the solid drugs dispensed from the tablet cases into a predetermined receiving section, position the discharge orifice of said predetermined receiving section discharge orifice to coincide with said guide portion; and controll the opening of said shutter to discharge the solid drug into said guide portion, wherein said guide portion comprises a base plate under said rotary plate and said inlet of said guide portion is a hole in said base plate, said shutter being located to open and close said opening in said base plate, and wherein said shutter is moved parallel to said base plate.

12. A solid drug filling apparatus as in claim 1 further comprising a mechanism to move said shutter across said plate opening in a linear, reciprocating manner.

* * * * *